March 3, 1953 R. LANDIS 2,630,466
EDDY-CURRENT CLUTCH AND BRAKE MOTOR
Filed Jan. 24, 1950 2 SHEETS—SHEET 1
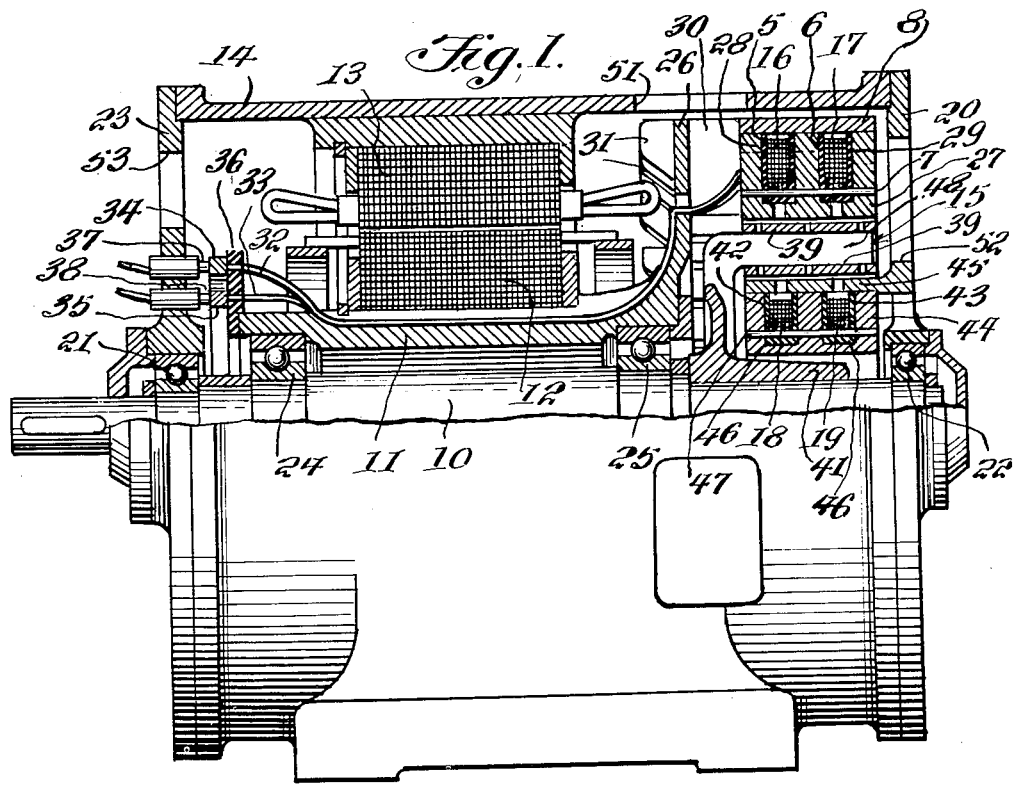
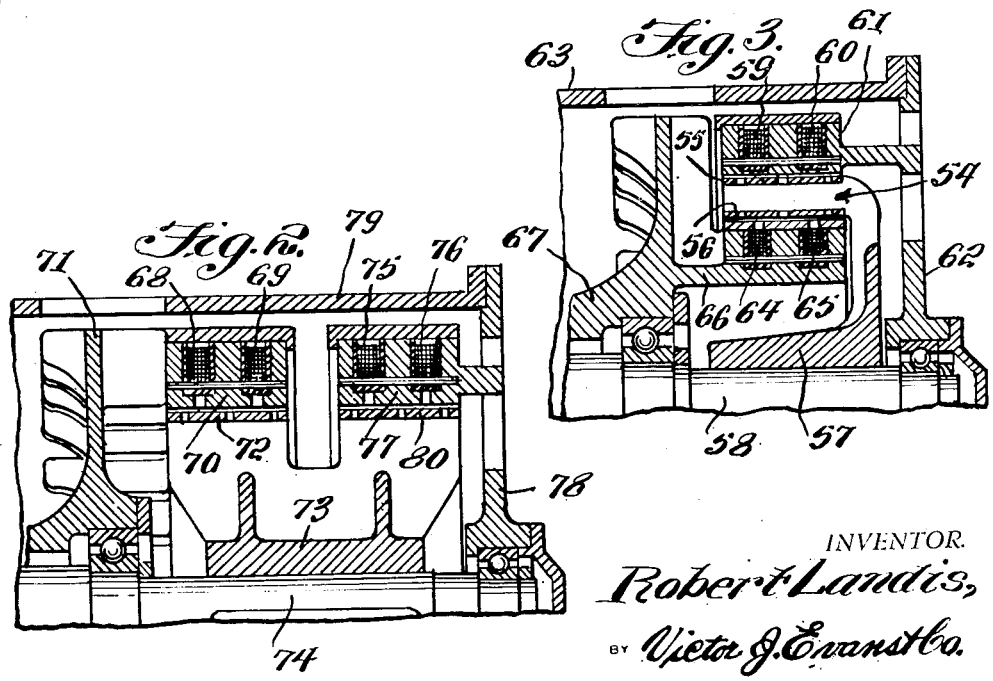
INVENTOR.
Robert Landis,
BY Victor J. Evans & Co.
ATTORNEYS March 3, 1953 R. LANDIS 2,630,466
EDDY-CURRENT CLUTCH AND BRAKE MOTOR
Filed Jan. 24, 1950 2 SHEETS—SHEET 2
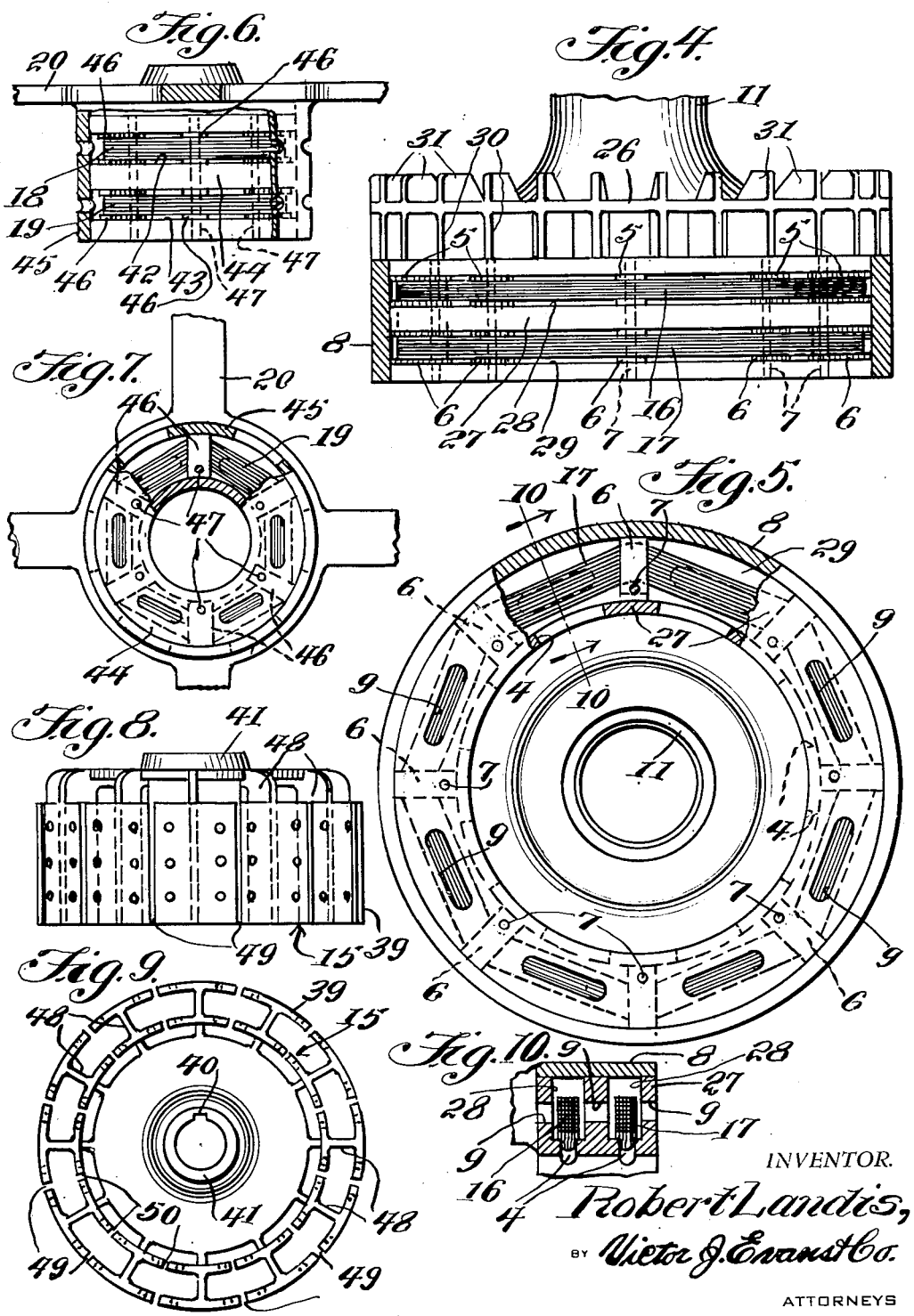
INVENTOR.
Robert Landis,
BY Victor J. Evans & Co.
ATTORNEYS Patented Mar. 3, 1953

2,630,466

UNITED STATES PATENT OFFICE 2,630,466

EDDY-CURRENT CLUTCH AND BRAKE MOTOR

Robert Landis, Milwaukee, Wis.

Application January 24, 1950, Serial No. 140,260

3 Claims. (Cl. 172—284)

This invention relates to electric motors having electro-magnetic or eddy-current clutch and brake instrumentalities incorporated therein, and in particular an electric motor particularly adapted for quick starting and stopping and in which the motor shaft is driven by an armature rotating within a field with the armature connected to the shaft through an electro-magnetic clutch and with the shaft held by an electromagnetic brake when released by the clutch.

The purpose of this invention is to provide a quick stopping and starting motor wherein the armature of the motor is positioned on a floating element between the shaft and field so that the shaft may be instantly disengaged or relieved from the influence of the field and simultaneously gripped by a stationary element.

In the usual stop and go motor mechanical means is provided for gripping the shaft wherein the current is stopped and where the shaft is held or stopped by an eddy-current coupling or electro-magnetic means separate units are provided and these require comparatively elaborate and costly installations. With this thought in mind this invention contemplates incorporating an eddy-current clutch or coupling in a motor housing and providing braking means of a similar character in combination therewith.

The object of this invention is, therefore, to provide means for incorporating an eddy-current clutch and an eddy-current brake in the housing of an electric motor.

Another object of the invention is to provide means for mounting the armature or motor winding of an electric motor whereby the armature may be instantly disconnected from the shaft and also whereby the shaft may be instantly gripped and held.

A further object of the invention is to provide a combination eddy-current clutch and brake in combination with an electric motor in which the complete motor is of a comparatively simple and economical construction.

With these and other objects and advantages in view the invention embodies a motor having a stationary housing with a shaft journaled in ends of the housing and in which a floating spider is journaled on the shaft and wherein the spider carries an armature winding that is positioned to coact with field windings of the housing and also eddy-current coils positioned to coact with a drum carried by the shaft, and in which the housing is provided with eddy-current coils positioned to coact with the drum to form a brake.

Other features and advantages of the invention will appear from the following description taken in connection with the drawings wherein:

Figure 1 is a longitudinal section through the eddy-current clutch and brake motor with the housing broken away and with the lower part thereof shown in elevation.

Figure 2 is a similar view through the eddy-current clutch and brake element with the motor elements omitted and showing a modification wherein the clutch and brake elements are aligned.

Figure 3 is a similar view showing a further modification wherein the clutch and brake elements are reversed in comparison to corresponding elements shown in Figure 1.

Figure 4 is a plan view of the eddy-current clutch with parts broken away showing the winding therein.

Figure 5 is an end elevational view of the eddy-current clutch member also with parts broken away showing the winding therein.

Figure 6 is a plan view of the eddy-current brake of the design shown in Figure 1 with parts of the brake ring and associated housing broken away, and with the drum carried by the shaft and other parts omitted.

Figure 7 is a view looking toward the inner end of the eddy-current brake element shown in Figure 6 with parts broken away.

Figure 8 is a plan view of the drum positioned between clutch and brake elements with other parts omitted.

Figure 9 is an end elevational view looking toward the end of the drum shown in Figure 8 with other parts omitted.

Figure 10 is a detail showing a cross section on line 10—10 of Figure 5 being taken through the clutch coil ring of the spider.

Referring now to the drawings wherein like reference characters denote corresponding parts the improved eddy-current clutch and brake motor of this invention includes a shaft 10 having a spider 11 journaled thereon with an armature winding 12 on the spider positioned to coact with a field winding 13 in a housing 14 and a drum 15 carried by the shaft and positioned between eddy-current clutch coils 16 and 17 carried by the spider, and brake coils 18 and 19 carried by an end plate 20 of the housing.

The shaft 10 is journaled in the housing of the motor through bearings 21 and 22 with the bearing 21 in an end plate 23 and the bearing 22 in the end plate 20. The spider 11 is journaled on the shaft 10 through bearings 24 and 25.

The clutch and brake end of the spider is provided with an annular web 26 having a heavy ring 27 extended therefrom and carried thereby. The ring 27 is provided with spaced annular grooves 28 and 29 in which the coils 16 and 17 are positioned, and as illustrated in Figure 1, the coils are carried by radially disposed U-shape saddles 5 and 6 which are formed of flat iron strips. The saddles 5 and 6 are secured in position by pins 7 that extend through the ring 27 as shown in Figures 1 and 5. An outer annular band 8 is positioned on the outer surface of the ring 27, providing a cover for the grooves 28 and 29. Air circulating openings 9 are provided through the ring 27, and similar openings 4 are provided in the base of the grooves 28 and 29. The ring 27 is connected to the web 26 by spaced ribs 30, and fins 31 are provided on the inner side of the web as shown in Figures 1 and 4, whereby the ribs and fins form fan blades which circulate air through the motor. The coils 16 and 17 are connected by wires 32 and 33 to slip rings 34 and 35 on an insulating ring 36 on the opposite side of the spider, and as illustrated in Figure 1, the rings engage contact points of wires 37 and 38 which are connected to any suitable source of current supply.

With the parts arranged in this manner the spider 11 is free to rotate about the shaft 10 and when it is desired to rotate the shaft the coils 16 and 17 are energized through the wires 32 and 33 whereby a magnetic force is set up that grips an outer band 35 of the drum 15, thereby forming a clutch with the drum 15 held to the shaft 10 by a key in a keyway 40 and the hub 41 of the drum on the shaft is rotated with the spider and armature of the motor.

The eddy-current brake is formed by the coils 18 and 19 which are positioned in grooves 42 and 43 of a ring 44 carried by a band 45 extended inwardly from the end plate 20. The coils are held by U-shape saddles 46, similar to the saddles 5 and 6 and the saddles are held by pins 47. Current is supplied to these coils by wires extended through openings through the end plate 20. When the coils 18 and 19 are energized and electro-magnetic force is set up which grips the drum 15 whereby the drum and shaft are held stationary in the housing.

Current is, therefore, alternately supplied to the clutch coils 16 and 17, and to the brake coils 18 and 19 whereby through a suitable control panel the coils 16 and 17 are energized with the motor operating and as soon as it is desired to stop the motor these coils are deenergized and current is supplied to the coils 18 and 19 which instantly stop the shaft of the motor by providing an eddy-current or electro-magnetic brake.

Vanes 48 are provided between the bands of the drum 15 to provide circulating means for drawing air through the clutch and brake actuating instrumentalities. In order to dissipate heat the band 39 is provided with openings or slots 49 and the inner section of the drum is provided with similar openings or slots 50 and the coils 16 and 17 and also the coils 18 and 19 are provided in open grooves as illustrated in Figures 5 and 7 whereby free circulation of air is provided around the elements for cooling. The wall of the housing 14 is also provided with openings 51, the end plate 20 with openings 52 and the end plate 23 with openings 53 whereby the housing is completely ventilated and with fan blades provided in the rotating elements the heat is dissipated and the parts cooled.

In the design illustrated in Figure 3 a drum 54 having an outer band 55 and an inner band 56 is carried by the hub 57 on a shaft 58 and braking coils 59 and 60 in a member 61 extended inwardly from an end plate 62 of a housing 63 are positioned on the outer side of the drum instead of on the inside with the braking coils positioned to influence the band 55, whereas clutch coils 64 and 65 on a hub 66 of a spider 67 similar to the spider 11 are positioned on the inside of the drum wherein they influence the inner band 56 for rotating the shaft with the spider. Connections are made to these coils similar to the connections shown in Figure 1 and the rotating elements are also provided with ribs, fins, and vanes which provide fan blades for circulating air through the parts.

In the design shown in Figure 2 clutch coils 68 and 69 similar to the coils 16 and 17 are positioned in a ring 70 carried by a spider 71 and these coils are positioned to influence a band 72 of a hub 73 on a shaft 74 for driving the shaft with the spider and armature of the motor. Brake coils 75 and 76 similar to the coils 18 and 19 are mounted in a ring 77 extended inwardly from an end plate 78 of a housing 79 whereby these coils influence a band 80 on the hub 73 and provide a brake for stopping the shaft.

It will be understood that the eddy-current clutch and brake coils may be mounted in various positions and substantially the same combination of elements may be provided for motors of different types or that operate under different conditions.

It will be understood that modifications may be made in the design and arrangement of the parts without departing from the spirit of the invention.

What is claimed is:

1. In an eddy-current clutch and brake motor, the combination which comprises a shaft, a cylindrical member having radially disposed members on one end providing a spider, an armature winding of the motor carried by the spider, a housing surrounding the spider and in which the shaft is journaled, field windings in the housing and positioned to coact with the armature winding of the motor, a drum including spaced cylindrical sections concentric with the shaft mounted on the shaft and keyed thereto, electromagnetic means carried by said spider and positioned around the outer cylindrical section of the drum whereby magnetic flux of the magnets coacts with the outer cylindrical section of the drum for causing the drum and shaft to rotate with the armature of the motor, and electromagnetic means carried by the housing and positioned whereby magnetic flux thereof coacts with the other cylindrical section of the drum to provide a brake.

2. In an eddy-current clutch and brake motor, the combination which comprises a shaft, a cylindrical member having radially disposed members on one end providing a spider, an armature winding of the motor carried by the spider, a housing surrounding the spider and in which the shaft is journaled, field windings in the housing and positioned to coact with the armature winding of the motor, a drum including spaced cylindrical sections concentric with the shaft mounted on the shaft and keyed thereto, electromagnetic means carried by said spider and positioned around the outer cylindrical section of the drum whereby magnetic flux of the magnets coacts with the outer cylindrical section of the drum for causing the drum and shaft to rotate with the armature of the motor, and electromagnetic means carried by the housing and positioned inside of the drum whereby magnetic flux of the magnets coacts with the inner cylindrical section of the drum to provide a brake.

3. In an eddy-current clutch and brake motor, the combination which comprises a shaft, a cylindrical member having radially disposed members on one end providing a spider, an armature winding of the motor carried by the spider, a housing surrounding the spider and in which the shaft is journaled, field windings in the housing and positioned to coact with the armature winding of the motor, a drum including spaced cylindrical sections concentric with the shaft mounted on the shaft and keyed thereto, electromagnetic means carried by said spider and positioned around the outer cylindrical section of the drum whereby magnetic flux of the magnets coacts with the outer cylindrical section of the drum for causing the drum and shaft to rotate with the armature of the motor, electromagnetic means carried by the housing and positioned inside of the drum whereby magnetic flux of the magnets coacts with the inner cylindrical section of the drum to provide a brake, and means alternately energizing the electromagnets carried by the spider and the electromagnets carried by the housing.

ROBERT LANDIS.

REFERENCES CITED

The following references are of record in the file of this patent:

UNITED STATES PATENTS

| Number | Name | Date |
|---|---|---|
| 2,025,487 | Winther | Dec. 24, 1935 |
| 2,317,290 | McIlvried | Apr. 20, 1943 |
| 2,333,863 | Hull | Nov. 9, 1943 |
| 2,343,291 | Gilfillan | Mar. 7, 1944 |
| 2,372,633 | Angold | Mar. 27, 1945 |
| 2,452,820 | Winther | Nov. 2, 1948 |
| 2,471,505 | Winther | May 31, 1949 |